United States Patent [19]

Dohnal et al.

[11] Patent Number: 5,128,605

[45] Date of Patent: Jul. 7, 1992

[54] MONITORING SYSTEM FOR STEP-TYPE SWITCHING TRANSFORMER

[75] Inventors: Dieter Dohnal; Kurt Kugler, both of Lappersdorf, Fed. Rep. of Germany

[73] Assignee: Maschinenfabrik Reinhausen GmbH, Regensburg, Fed. Rep. of Germany

[21] Appl. No.: 673,206

[22] Filed: Mar. 21, 1991

[30] Foreign Application Priority Data

Mar. 21, 1990 [DE] Fed. Rep. of Germany ....... 4009038

[51] Int. Cl.$^5$ ............................... G05F 1/14
[52] U.S. Cl. .................... 323/340; 323/255; 323/902
[58] Field of Search ............. 323/255, 256, 257, 258, 323/346, 341, 343, 902

[56] References Cited

U.S. PATENT DOCUMENTS

| | | | |
|---|---|---|---|
| 3,436,646 | 4/1969 | Prescott | 323/340 |
| 3,544,884 | 12/1970 | Prescott | 323/340 |
| 3,555,404 | 1/1971 | Bleibtreu | 323/340 |
| 3,684,948 | 8/1972 | Eissmann | 323/340 |
| 3,978,395 | 8/1976 | Legnaioli | 323/340 |
| 4,048,520 | 9/1977 | Muskovac et al. | 323/902 |

FOREIGN PATENT DOCUMENTS 213329 9/1984 Fed. Rep. of Germany.

OTHER PUBLICATIONS

Bill Olschewski, "Optical Coupling Extends Isolation-Amplifier Utility", Electronics, Aug. 19, 1976, pp. 81–88.
Reinhausen Manufacturing's Brochure "Load Tap Changer Type UVT".

Primary Examiner—Peter S. Wong
Attorney, Agent, or Firm—Herbert Dubno; Andrew Wilford

[57] ABSTRACT

A multiphase stepping transformer wherein a closed vacuum interrupter at each phase is opened before a respective stepping switch is advanced is controlled by continuously monitoring current flow through the interrupters. Before the interrupters are opened an error signal is generated unless all of the monitored current flows lie to one side of a predetermined threshold. After the interrupters are opened an error signal is generated if current flow is detected through any of the interrupters. Advance of the stepping switches is blocked on generation of any error signal. The apparatus includes for each interrupter a respective current detector, a light-emitting diode energized by the respective detector, a light receiver associated with each diode, and a light-transmitting cable connecting each diode with the respective receiver.

9 Claims, 3 Drawing Sheets 5,128,605

MONITORING SYSTEM FOR STEP-TYPE SWITCHING TRANSFORMER

FIELD OF THE INVENTION

The present invention relates to a step-type switching transformer. More particularly this invention concerns a method of and apparatus for monitoring the operation of the stepping switches of such a transformer.

BRIEF DESCRIPTION OF THE DRAWING

The above and other objects, features, and advantages will become more readily apparent from the following, reference being made to the accompanying drawing in which.

BACKGROUND OF THE INVENTION

In stepping-switch systems for transformers wherein instead of the standard contacts used for switching the load a vacuum-type switch is employed, a monitoring system is required to prevent accidents when the vacuum switch does not open soon enough or at all when stepping to the next position. When the vacuum switch does not open the switching has to take place while under load so that substantial arcing can be counted on. In a high-power system such arcing can destroy the stepping switches.

Figure 1:
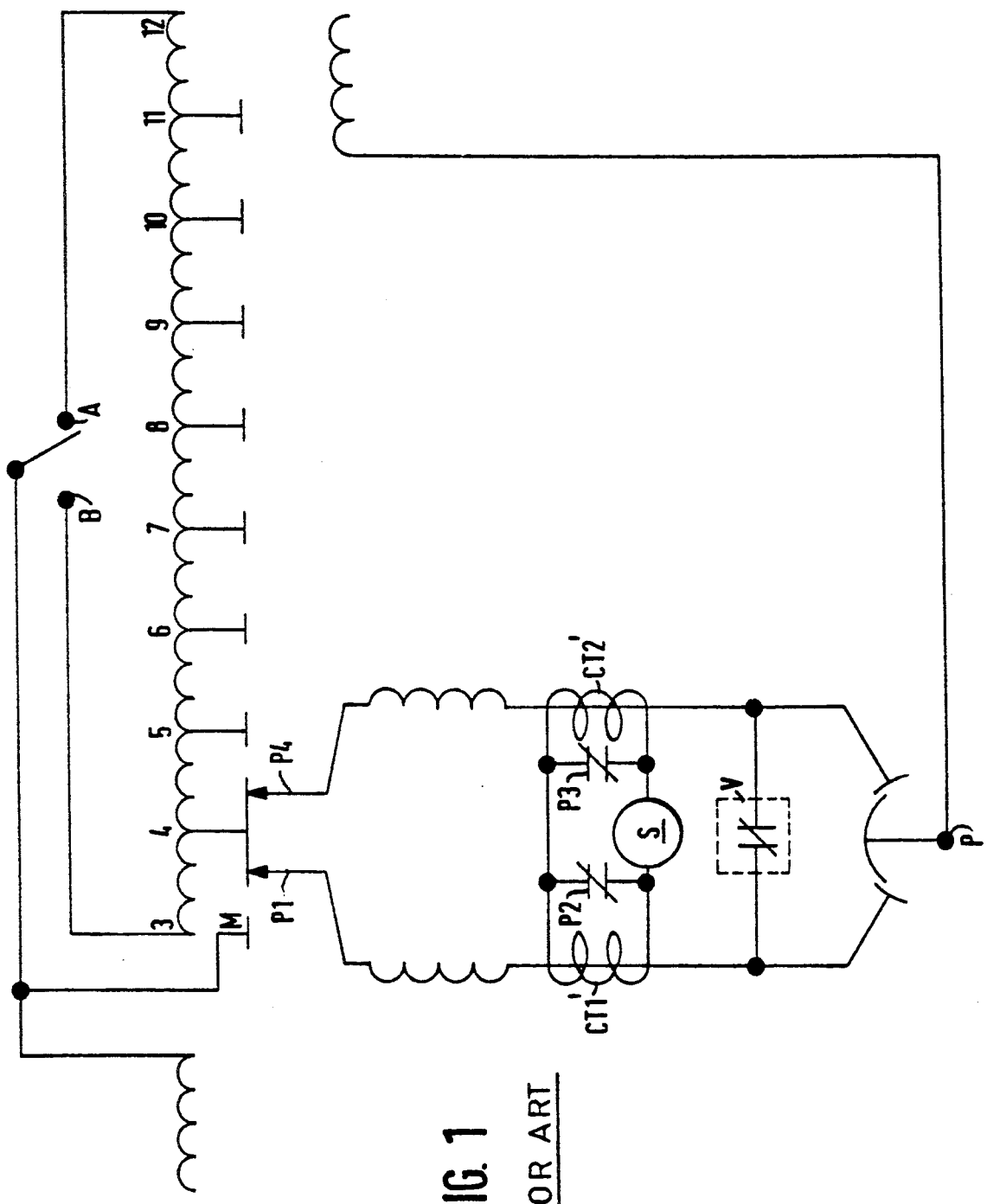
FIG. 1 is a schematic diagram of a prior-art system.

Such a monitoring system is sold by MR Reinhausen Manufacturing as a Type UVT load tap changer. FIG. 1 shows the switching circuit for a single phase. Here parallel to current converters CT1' and CT2' there are respective mechanical switches P2 and P3. A solenoid S connected across them detects the presence of any current flow in the movable contacts P1 and P4 during what is supposed to be load-free switching across contacts 3 through 12 of a transformer winding M having a reversing switch A, B. The switch P2 is controlled such that it opens after a vacuum interrupter V has taken over the current flow from a bypass contact and before the contact P1 opens and closes after P1 closes again. The switch P3 opens after the vacuum interrupter V has taken over the load and before the selector contact P4 opens and closes after P4 closes again but before vacuum interrupter V has closed again.

If the vacuum interrupter V fails so that during a switching operation one of the switches P1 or P4 continues to conduct current, the solenoid S is actuated. This solenoid S is normally energized to hold open a mechanical latch that, when closed, prevents movement of the stepping switch.

Such an arrangement is complex and has numerous parts which can fail. In addition the monitoring and control system is provided in the oil-filled stepping switch so that this device must be taken apart to make any adjustments or repairs, and any such servicing requires that the oil be drained and subsequently refilled.

OBJECTS OF THE INVENTION

It is therefore an object of the present invention to provide an improved method of and apparatus for monitoring operation of a stepping switch of a step transformer.

Another object is the provision of such an improved method of and apparatus for monitoring operation of a stepping switch of a step transformer which overcomes the above-given disadvantages, that is which is relatively simple, which can be provided outside the oil-filled switching equipment, and which can be easily reset.

SUMMARY OF THE INVENTION

According to this invention a multiphase stepping transformer wherein a closed vacuum interrupter at each phase is opened before a respective stepping switch is advanced is controlled by continuously monitoring current flow through the interrupters. In a first period before the interrupters are opened an error signal is generated unless all of the monitored current flows lie to one side of a predetermined threshold. In a second period after the interrupters are opened an error signal is generated if current flow is detected through any of the interrupters. Advance of the stepping switches is blocked on generation of any error signal.

Before the interrupters are opened they should all be either conducting or not, depending on whether the transformer is under load or not. If one is not conducting while the others are or vice versa, this is proof that something is wrong. Once they have been actuated so that they all should be opened, if current is flowing through any of them, this fact is once again proof that something is wrong and stepping of the switches is blocked by a mechanical latch operated by the controller.

The apparatus according to this invention includes for each interrupter a respective current detector, a light-emitting diode energized by the respective detector, a light receiver associated with each diode, and a light-transmitting cable connecting each diode with the respective receiver This allows everything but the transmitter and the detector to be mounted outside the housing of the transformer equipment, where it can be serviced and reset easily. Each cable is integral with the respective diode and receiver so it can pass through the oil bath with no problems.

The controller of the instant invention also includes respective switches controlling the respective different periods before and after the interrupters are opened. These switches are reed switches coupled to the stepping switches.

The detectors according to this invention are saturation-type current detectors with built-in limiters and each detector is mounted directly on the respective interrupter.

The controller further has bistable relays tripped by the error signals and normally operating a mechanical latch that locks advance of the stepping switches until the problem is cleared up.

SPECIFIC DESCRIPTION

Figure 2:
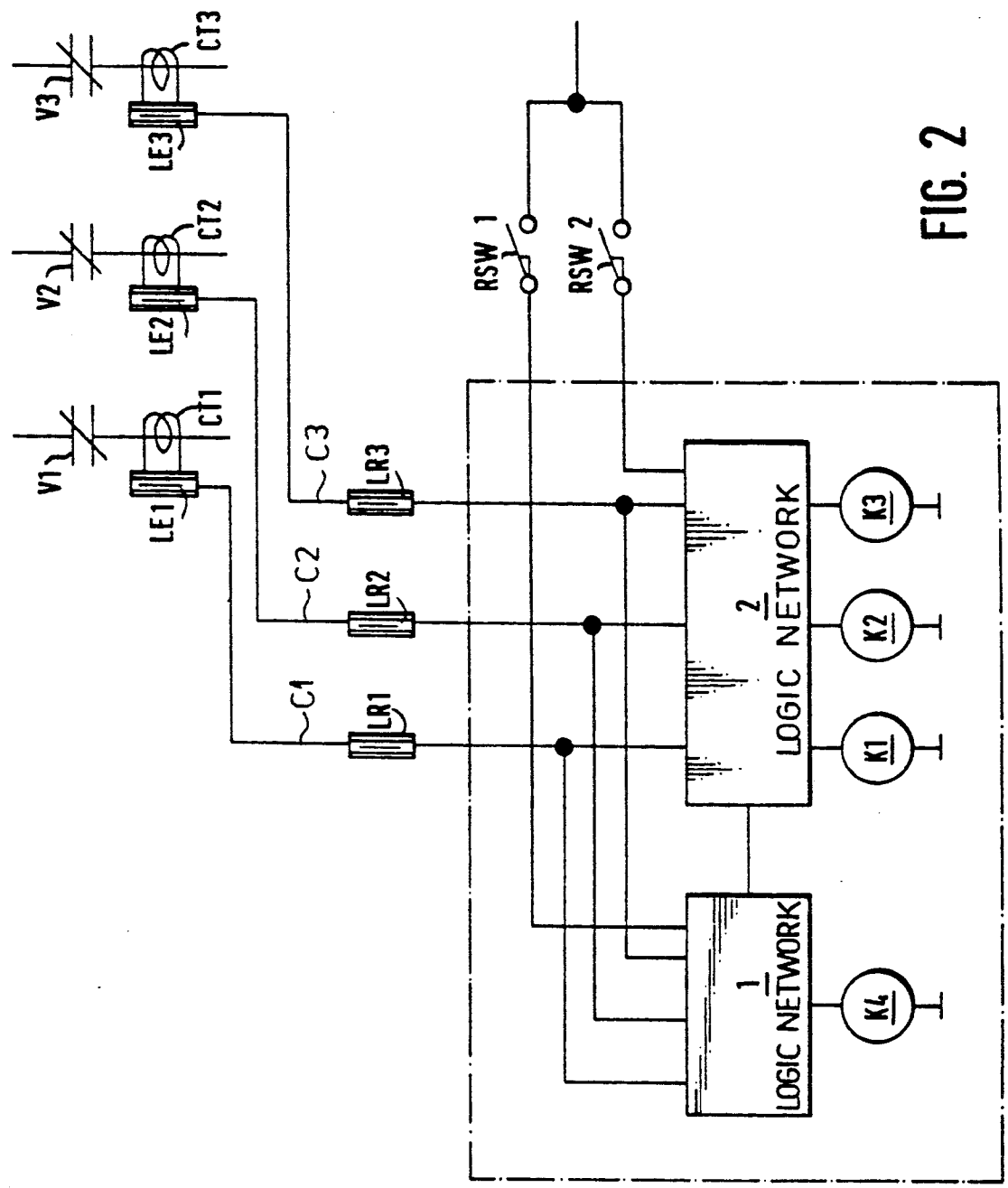
FIG. 2 is a schematic diagram of the system according to this invention.

As seen in FIG. 2 the current flows through the vacuum interrupters V1, V2, V3, which are each associated with a respective phase of the load switch, are each monitored by a respective saturation current converter CT1, CT2, CT3 having a built-in limiter. Each such converter CT1, CT2, and CT3 can energize a respective light-emitting diode acting as a transmitter LE1, LE2, LE3 connected via fiber-optic cables C1, C2, and C3 to respective light receivers LR1, LR2, and LR3, the latter being located well outside the equipment. The converters CT1, CT2, and CT3 and limiting circuitry are mounted right on the respective interrupters V1, V2, and V3, being molded right into their housings and are set up to respond when a current of more than 10A flows through them. Thus the receivers LR1, LR2, and LR3 report when there is any significant current moving in the respective interrupters V1, V2, and V3. The cables C1, C2, and C3 can be single or multifilament fiber-optic units with integral transmitters and receivers and the receivers LR1, LR2, and LR3 can have standard TTL outputs.

This system operates with two main verifications of current flow in the interrupters V1, V2, and V3. Two reed switches RSW1 and RSW2 operated directly by the shaft on which the poles of the stepping switches are carried are actuated to operate one of two logic networks 1 or 2 to determine if any of the interrupters V1, V2, or V3 has failed.

Switch RSW1 is actuated to start the first monitoring step in which the circuit 1 compares the outputs of all three receivers LR1, LR2, and LR3 and produces an error signal at K4 if they are not all the same. This error signal can be used to block switching.

The second monitoring step is triggered by actuation of the switch RSW2 after the interrupters should all be open-circuited but before the load-free movement of the respective step switches. If after this second monitoring step is initiated, the circuit 2 determines that there is current flow in any of the interrupters V1, V2, or V3, it produces an error signal K1, K2, or K3 depending on which one is conducting.

Figure 3:
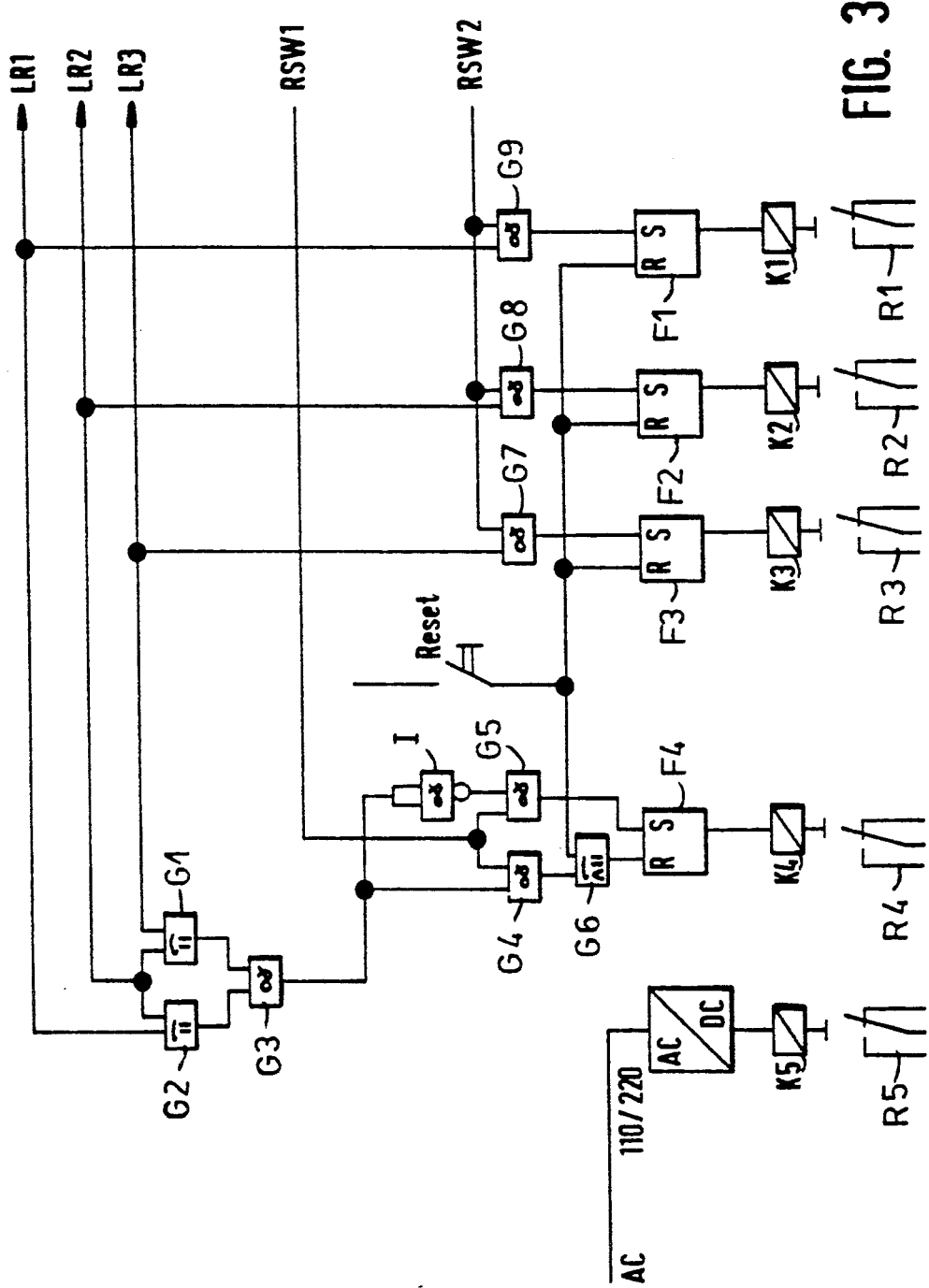
FIG. 3 is a block diagram illustrating the evaluating circuit of the system of this invention.

FIG. 3 shows a circuit which can carry out the functions of both circuits 1 and 2. The inputs from the receivers LR1, LR2, and LR3 are fed to NOR gates G1 and G2 whose outputs are fed to an AND gate G3 whose output is fed directly to another AND gate G4 and through an invertor I to another AND gate G5. The AND gates G4 and G5 are also fed inputs from the switch RSW1 so they only produce an output when both inputs are energized. The output of the AND gate G4 goes through an OR gate G6 to a flip flop F4 that produces the output K4. The other outputs K1, K2, and K3 are produced by flip flops F1, F2, and F2 each getting a reset input R from the reset switch like the NOR gate G6 and from an AND gate G7, G8, and G9 each having one input from the respective receiver LR1, LR2, and LR3 and another input from the switch RSW2. The output K4 thus reports a disturbance at the time the switch RSW1 is momentarily closed unless all three inputs indicate current present or all three indicate no current present. On the other hand the outputs K1, K2, or K3 are produced when any of the vacuum interrupters fails when the switch RSW2 is momentarily closed.

Bistable relays R1 through R5 can be set by the outputs K1 through K4, and even K5 which indicates power on, and these relays can be keyed so only authorized personnel can reset them. When flip-flops are used as in FIG. 3, the reset switch should be similarly protected.

We claim:

1. A method of controlling a multiphase stepping transformer wherein a closed vacuum interrupter at each phase is opened before a respective stepping switch is advanced, the method comprising the steps of:
   continuously monitoring current flow through the interrupters;
   in a first period before the interrupters are opened an error signal is generated unless all of the monitored current flows lie above or below a predetermined threshold;
   in a second period after the interrupters are opened an error signal is generated if current flow is detected through any of the interrupters; and
   blocking advance of the stepping switches on generation of any error signal.

2. An apparatus for controlling a multiphase stepping transformer wherein a closed vacuum interrupter at each phase is opened before a respective stepping switch is advanced, the apparatus comprising:
   sensor means including respective detectors associated with the interrupters for continuously monitoring current flow through the interrupters; and
   control means connected to the switches for blocking advance of the stepping switches when
      in a first period before the interrupters are opened an error signal is generated unless all of the monitored current flows lie above or below a predetermined threshold, and
      in a second period after the interrupters are opened an error signal is generated if current flow is detected through any of the interrupters.

3. The apparatus defined in claim 2 wherein the sensor means includes for each interrupter:
   a respective current detector,
   a light-emitting diode energized by the respective detector,
   a light receiver associated with each diode, and
   a light-transmitting cable connecting each diode with the respective receiver.

4. The apparatus defined in claim 3 wherein each cable is integral with the respective diode and receiver.

5. The apparatus defined in claim 2 wherein the control means includes
   respective switches controlling the phases.

6. The apparatus defined in claim 5 wherein the switches are reed switches coupled to the stepping switches.

7. The apparatus defined in claim 2 wherein the detectors are saturation-type current detectors with built-in limiters.

8. The apparatus defined in claim 7 wherein each detector is mounted directly on the respective interrupter.

9. The apparatus defined in claim 2 wherein the control means includes bistable relays tripped by the error signals.

* * * * *